Figure 1:
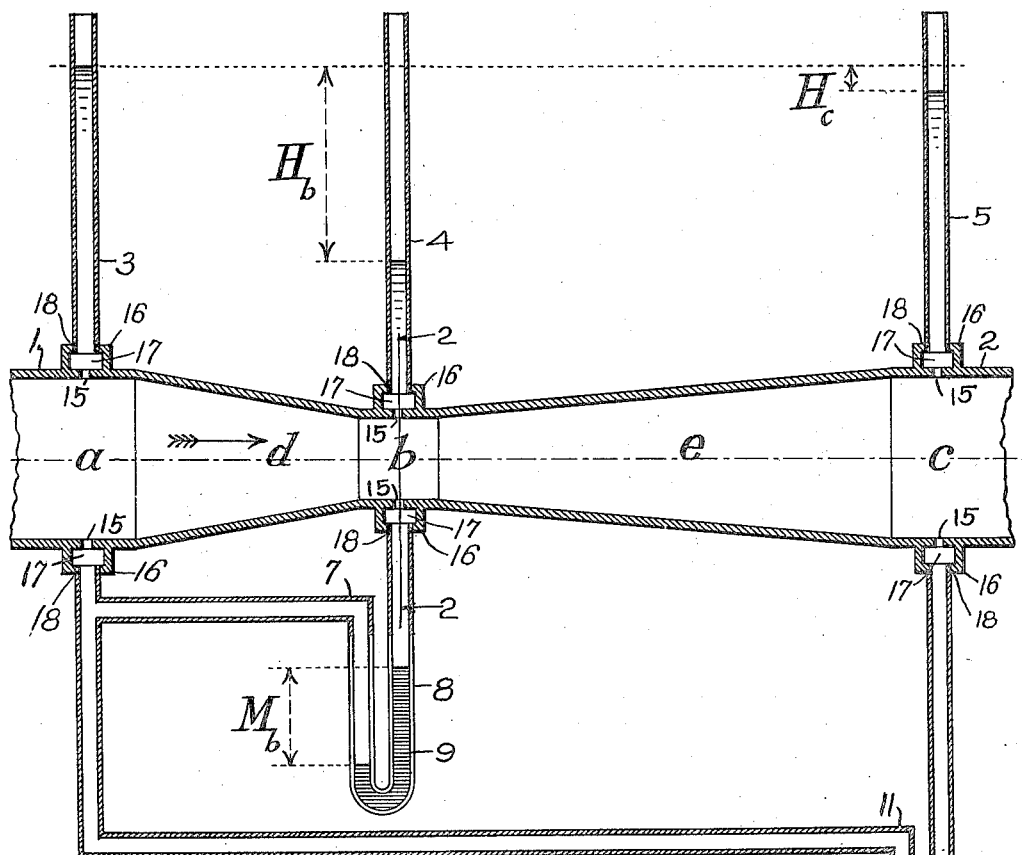

June 1, 1926.

F. N. CONNET 1,586,948

APPARATUS FOR AND METHOD OF METERING FLUIDS OF HIGH VISCOSITY

Filed April 9, 1923

INVENTOR.
Frederick N. Connet
BY Thomas A. Jenckes Jr.
ATTORNEYS.

Patented June 1, 1926.

1,586,948

UNITED STATES PATENT OFFICE.

FREDERICK N. CONNET, OF PROVIDENCE, RHODE ISLAND, ASSIGNOR TO BUILDERS IRON FOUNDRY, OF PROVIDENCE, RHODE ISLAND, A CORPORATION OF RHODE ISLAND.

APPARATUS FOR AND METHOD OF METERING FLUIDS OF HIGH VISCOSITY.

Application filed April 9, 1923. Serial No. 630,839.

My invention relates to Venturi and similar types of pressure responsive fluid meters.

The object of my invention is to provide an attachment for and an improved method of more accurately metering fluids of high viscosity in a Venturi or similar type of meter. The standard Venturi meter tube comprises a tube having a restricted throat portion, a portion having radially converging sides connecting said throat and the inlet pipe, and a portion having radially diverging sides connecting said throat and the outlet pipe. According to Venturi's law, fluids in passing through pipe portions with radially converging sides lose head and gain velocity, and in passing through pipe portions with radially diverging sides gain head and lose velocity. By connecting pressure difference indicating means to the inlet and throat, the decrease in pressure measures the loss of head (commonly called Venturi head), and knowing the cross-sectional areas of the meter tube at the points of attachment of said registering means thereto at the inlet and throat respectively, and the loss of head, the velocity may be calculated therefrom by means of the usual Venturi formula. So much of my structure and method is old and covered in the original Venturi meter patent of Hershel 381,373 granted April 17, 1888, and other patents. Venturi meter tubes have gone into general use, and work exceedingly well for water and other comparatively non-viscous fluids. However, when a fluid of high viscosity such as oil, tar, etc., is passed through said tube, it tends to cling to the sides of the pipe and tube, and the molecules thereof to each other. The observed differential head reading (observed Venturi head) is thus rendered exceedingly inaccurate for it is obvious that it measures not only the actual loss of head indicative of the velocity, (theoretical Venturi head), but also the viscosity loss due to skin friction and eddy currents from the inlet to the throat portion. Viscosity as herein used is the kinematic viscosity or the ratio of the absolute viscosity to the density. If pressure difference indicative means are provided between two points of equal cross sectional area on said meter tube preferably at the inlet and outlet portions thereof, it is obvious that the indicated pressure difference will indicate the viscosity loss between these two points which we may term friction head, and that this indicated loss of head due to viscosity between the inlet and outlet will vary as the loss of head due to viscosity between the inlet and throat portion of said tube as the viscosity and velocity of the fluid vary. For a given size of Venturi tube, the ratio of friction head to the observed head will always be the same for fluids of the same viscosity when flowing at equal velocity. By actual experiment the actual velocity of fluids of different viscosity flowing through the meter tube can be determined, and with the means I have shown it is possible at the same time to observe the friction head and the observed Venturi head and the ratio between them which varies for equal velocities as the viscosity of the fluid varies. From the actual velocities and the velocities computed from corresponding Venturi differentials the corresponding coefficients may be computed and then tabulated against their corresponding ratios. Later in metering any fluid the ratio of pressure differences is found and by reference to the above table, the proper coefficient is determined, and then multiplied by the rate computed from the usual Venturi formula and the Venturi differential to give the actual rate of flow of the fluid passing through. Since the coefficient varies as the ratio of friction head over observed Venturi head which varies as the actual viscosity and velocity of the fluid passing through the meter varies which is the natural law conceived of and discovered by me, it is obvious that means may be provided for automatically correcting the velocity reading on an attached register as the viscosity and velocity of the fluid passing through said meter varies. As stated, the embodiment of my invention shown comprises the combination of a Venturi meter tube having pressure difference indicative means between the inlet and throat portions thereof to measure the observed Venturi head, and pressure difference indicative means attached to said tube preferably at two points of equal cross sectional area, preferably at the inlet and outlet thereof to measure the friction head whereby the ratio of said friction head to observed Venturi head may be applied to indicate the value of the proper viscosity and velocity correction coefficient of velocity of flow to employ in the usual Venturi formula to give the actual velocity or rate of flow of the fluid passing through, and the broad general process of so doing described above.

Hitherto in obtaining the coefficient for correcting for viscosity, turbulence and other conditions present; temperature, pressure and other variables had to be taken into consideration. Employing my method, the correctness of which may be mathematically proved and which as explained depends only on the relationship between the ratios of pressure differences and the coefficients, the meter tube becomes its own viscosity meter and becomes independent of the temperature, pressure and other conditions referred to above and entirely eliminates the use of the former long mathematical methods, charts, etc., used to correct for viscosity, etc., by making use of the discovery that a relationship exists between the coefficients and the ratios of the said pressure differences. It is not even necessary to know the temperature, pressure, viscosity, etc. The coefficients vary and the ratios of the pressure differences change with changes in viscosity and velocity. Hence it is not necessary to determine these variations but merely to observe the relation between the coefficients and the ratios.

These and such other objects of my invention as may hereinafter appear will be best understood from a description of one embodiment thereof, such as is shown in the accompanying drawings:

In the drawings, Fig. 1 is a longitudinal sectional view of a Venturi meter tube and adjacent sections of the pipe showing two types of pressure difference indicative means attached thereto.

Figure 2:
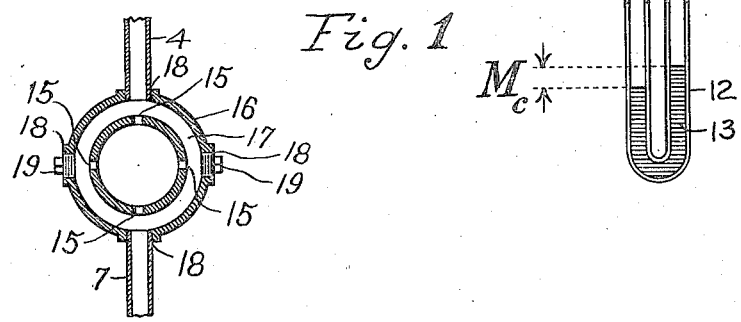

Fig. 2 is a cross section of the Venturi meter tube taken along the lines 2—2 of Fig. 1.

In the drawings, $a$ represents generally the inlet portion of a standard Venturi meter tube and the adjacent section of the attached pipe 1, $b$ represents the restricted throat portion of said meter tube, and $c$ represents generally the outlet portion of said tube and the adjacent section of the attached pipe 2. $d$ represents the portion of the Venturi meter tube provided with radially converging sides, and $e$ represents the portion of the tube provided with radially diverging sides. Any type of pressure difference indicative means may be employed. I have shown two types in the drawings, the type shown in the upper part of the drawing (above the meter tube), to be employed when the pressure is low, and the type shown in the lower part of the drawing, (below the meter tube) to be employed when the pressure in the pipe is high as is often the case in metering highly viscous fluids. The first type is represented by the vertical pipe 3 attached to the inlet $a$ of the tube, and the vertical pipe 4 attached to the throat of the tube. Said pipes 3 and 4 may be provided with transparent portions and scales so that the pressure difference between these two points may be readily read off. This gives us the observed Venturi head $H_b$ as shown in the drawing. The portion $d$ of the Venturi meter tube with converging sides functions as a primary pressure differential producing element to produce in the manometer attached to the inlet and throat thereof or other primary pressure differential indicating device the primary differential $H_b$, the entire portion $d$, with manometer attached as described functioning as a primary pressure differential determining device acted upon by the entire flow through the conduit. As shown the Venturi meter tube is of the usual ordinary type without having its interior modified in any way to interfere with the free passage of the entire flow in the conduit therethrough, and I therefore in the claims employ the words "internally unmodified" to signify a meter tube of this description. So much of my device is admittedly old, most Venturi meters in use being provided with means to measure the pressure difference between the inlet and throat, or the observed Venturi differential head. For non-viscous fluids the observed Venturi differential head practically equals the theoretical Venturi or true velocity head. To correct the observed Venturi head to give the theoretical Venturi or true velocity head for highly viscous fluids I provide the additional means now to be described.

My invention consists in providing in combination with the structure previously described, a vertical pipe 5 at the outlet $c$ of said tube. Said pipe 5 may also be provided with a transparent portion and a scale. Where my invention is employed the cross sectional area of the pipe 1 at the inlet $a$ or upstream end of the meter tube preferably equals the cross sectional area of the pipe 2 at the outlet $c$ or down-stream end of said tube. It is obvious therefore that the pipes 3 and 5 provide means for measuring the pressure difference between the inlet $a$ and outlet $c$ and that a comparison of the two indicates the loss sustained by a highly viscous fluid in flowing through the meter tube, or the so-called friction head shown as $H_c$ in the drawing. Since the friction loss between the inlet $a$ and outlet $c$ and the loss between the inlet $a$ and throat $b$ varies, as when the viscosity and velocity of the fluid varies, we know that the reading $H_c$ bears a constant relation to the friction loss in the observed Venturi head $H_b$ for fluids of the same viscosity at equal velocities. It is also obvious that the ratio $H_c/H_b$ will always be the same for fluids of the same viscosity at equal velocities. By experiments, we can determine the actual velocity of flow of fluids of different viscosities in said meter tube, at the same time observing the friction head $H_c$ and the observed head at the throat $H_b$ and computing therefrom the ratio $H_c/H_b$ between said friction head and observed Venturi head. It is obvious that the ratio $H_c/H_b$ will vary as the viscosity and velocity of the fluid varies. The actual velocities may be tabulated if desired. In any event, we may obtain from them viscosity and velocity correction coefficients which are always constant for fluids of a certain viscosity at given velocities by dividing the actual velocities of the viscous fluid by the known theoretical velocity of a perfectly mobile fluid. These coefficients and the corresponding observed ratios $H_c/H_b$ can be tabulated in their relation to each other. Thus, C (correction coefficient) = actual measured velocity of a viscous fluid divided by the theoretical velocity of perfectly mobile fluid as computed from the observed Venturi head and the usual Venturi formula, and which varies as $H_c/H_b$. The apparatus described above may be conveniently calibrated as follows for fluids of different viscosities, said method of calibration as explained hitherto being substantially the method I employed to confirm my discovery of the aforementioned natural law that a certain definite relationship exists between the correction coefficients and the ratios $H_c/H_b$ for fluids of different viscosities. A fluid of an undetermined viscosity may be passed through the pipe 1 and the Venturi meter tube, the actual rate of flow of said fluid determined by actual measurement of the volume or weight of said fluid passing through said tube within a definite measured period of time. To calibrate therefore, measure the two differentials $H_b$ (observed Venturi head) and $H_c$ (observed friction head), the volume or weight of the fluid of undetermined viscosity passing through the conduit and tube within a definite measured period of time, compute the theoretical rate of flow from the observed Venturi head and the usual Venturi formula as given below, observe and compute the ratio of loss of friction head $H_c$ over the observed Venturi head $H_b$, compute the actual rate of flow from the volume or weight for the measured time and the correction coefficient C by dividing the actual measured rate of flow by the theoretical rate of flow computed from the observed Venturi head and the usual Venturi formula and then tabulate the relationship between the ratios $H_c/H_b$ and the coefficients C so that it may conveniently be used in the future. As explained, by repeating this calibration for viscous fluids over a wide range of viscosities, tables indicating the relationship between the ratios $H_c/H_b$ and the correction coefficients C for these different viscosities may be prepared. For the practical working out of the natural law discovered by me, viscosity, density and velocity of the fluid and the size of the tube are the only conditions which directly affect the measurement, the temperature, pressure and other physical facts having no direct bearing on the relationship between the correction coefficients C and the ratios $H_c/H_b$. After having first conceived the natural law mentioned above, of an apparatus which may be used to prove said natural law, and the method of calibrating said instrument in accordance with said natural law as explained above, I devised a quick method employing this natural law, of metering fluids of different high viscosities having, as explained, previously tabulated the relationship between the correction coefficients C and the corresponding ratios $H_c/H_b$ for fluids of different viscosities over quite a wide range. In this new method of metering fluids of different viscosities, I employ the same apparatus as described above for use in calibrating and in proving this natural law, namely a conduit containing a Venturi meter tube with two pressure differential producing and pressure indicating means attached thereto, namely one to points of different cross sectional area on said conduit, preferably to the inlet $a$ and throat $b$ of said tube and preferably the other to points of similar cross sectional area on said conduit preferably to the inlet $a$ and outlet $c$. I thus observe the differentials $H_c$ and $H_b$ produced when a fluid of undetermined viscosity flows through said conduit and meter, compute the ratios of the differentials thus produced, refer to the above determined and tabulated data of relationship between said correction coefficient C corresponding to the then observed ratio $H_c/H_b$ and obtain therefrom the proper correction coefficient C corresponding to the then observed ratio $H_c/H_b$, compute the theoretical rate of flow from the Venturi head and the usual Venturi formula and multiply the thus found theoretical flow and the thus obtained proper correction coefficient C to obtain the actual rate of flow corrected for viscosity. Having once found this coefficient C, for fluids of certain viscosities at given velocities as just explained we may then on actually observing the ratio $H_c/H_b$ on my apparatus as described above, find out from the tables the proper coefficients which are always constant for fluids of a certain viscosity at given velocities, to substitute in the usual Venturi formula, to give the actual velocity of the fluid passing through the meter. The Venturi formula thus becomes, actual velocity=

$$C \times \sqrt{R^2/(R^2-1)} \times \sqrt{2gH_b}.$$

My invention merely provides means for and the process of determining the proper C to substitute in the above formula, the balance of the formula being admittedly old and susceptible of mathematical proof. In the formula, R=cross sectional area at inlet $a$ divided by the cross sectional area at throat $b$, $g$=acceleration of gravity, a constant, and $H_b$=the observed Venturi differential head. It is obvious that the tables once having been made for fluids of certain viscosities and velocities, other coefficients can be obtained for substitution in the usual Venturi formula to give the actual velocity of fluids of unknown viscosities, the ratio $H_c/H_b$ thereof having been observed, by interpolating between the tabulated $H_c/H_b$ and the corresponding tabulated coefficients. Since stated, as the ratio $H_c/H_b$ varies as the viscosity and velocity of the fluid varies, it is obvious that mechanical means may be provided for automatically correcting the velocity reading on an attached register as the viscosity and velocity of the fluid passing through the meter tube varies.

In the lower half of the drawing (below the meter tube), I show the preferred embodiment of my invention, which as stated is more particularly suited for measuring fluids of high viscosity which are usually piped under high pressure which may be used as explained above for either calibrating or later actually measuring the rate of flow of an undetermined viscous fluid. This embodiment preferably consists of two sets of manometers, a simple form of which is shown in the drawing. I attach one end of a simple manometer consisting of a bent pipe 7 for measuring the pressure difference between the inlet $a$ and throat $b$ to the pipe 1 at the inlet $a$, and the other end of said pipe to the throat $b$ and provide said pipe 7 with a transparent U-shaped portion 8 provided with a scale if desired. I locate a pressure difference indicating fluid preferably mercury 9 in the transparent U-shaped portion 8 of said pipe. The pressure difference is thus indicated in the drawing as $M_b$. As explained previously, manometers have generally been used to measure the Venturi or observed head, and so much is admittedly old. The preferred embodiment of my invention comprises the combination of the structure so far described with another manometer attached to the inlet $a$ and the outlet $c$, the cross-sectional areas of the points of attachment at the inlet $a$ and outlet $c$ being the same. I attach one end of the manometer, which in the simple form shown comprises the bent pipe 11, directly to the inlet $a$, or as shown in the drawing indirectly thereto through the pipe 7, the pressures at the inlet $a$ and in the pipe 7 in the inlet side of the mercury 9 being similar, and the other end of said bent pipe 11 to the outlet $c$, said pipe 11 being provided with a transparent U-shaped portion 12 provided with a scale if desired. I place a pressure difference indicating fluid preferably mercury 13 in the transparent U-shaped portion 12 of said pipe 11. The pressure difference is thus indicated in the drawing as $M_c$. It is obvious that this structure provides a preferred embodiment of means to indicate the friction head or $H_c$ afore-described.

Either the vertical pipes 3, 4 and 5 or the bent pipes 7 and 11 may be attached directly to the meter tube. In practice, however, as if only one pressure orifice is provided, it is apt to get clogged up, and is not able to so delicately indicate the exact pressure which exists when a fluid flows through a pipe as the average pressure obtained from several orifices, some means to accomplish these ends is usually provided. Fig. 2 shows a preferred embodiment of this means. A plurality of orifices 15, four as shown in the drawings are cut in the pipe where desired at the inlet, outlet or throat, and individual jackets 16, having pressure chambers 17 extending entirely around the pipe at these points are provided. Said jackets 16 are provided with a plurality of orifices 18, four as shown in the drawings, which are adapted to be either filled with the plugs 19, or to receive the ends of the pressure indicating pipes 3, 4 and 5, or 7 and 11, as desired. The entire Venturi meter tube including the portion $d$ with converging sides and the portion $e$ with diverging sides functions as an auxiliary pressure differential producing element to produce in the manometer or auxiliary pressure differential indicating device attached to the inlet and outlet thereof, an auxiliary or secondary pressure differential differing in amount from the primary pressure differential whereby the ratio between them may be more readily determined, which in my preferred embodiment though not necessarily is the friction head $H_c$, the portions $b$, $d$ and $e$ with manometer attached as described functioning as an auxiliary or secondary pressure differential determining device acted upon by the entire flow through the conduit. As it is obvious that different differentials must be produced to provide a ratio between them, a more sharply defined ratio will be provided if the pressure differential producing elements are of an essentially different design or type as is shown in my preferred embodiment, where the primary pressure differential determining device comprises one cone and manometer attached as explained and the second pressure differential determining device comprises two cones having their small ends joined together and manometer attached as explained.

Although I have shown a Venturi meter tube as the primary pressure differential producing element, it is obvious that an orifice plate, Pitot tube or any other similar pressure differential producing element may be employed, consequently the phrase "primary pressure differential determining device" is employed to specify any suitable type of pressure differential producing element in a conduit having suitable means attached for indicating the differential, wherein the differential produced varies in a determinable manner with the rate of flow.

Though I have shown the auxiliary differential producing element as comprising the whole Venturi meter tube, it is obvious that any section of the conduit or of the type of meter tube employed in proximity to the primary pressure differential producing element may be used, and it is immaterial whether its extremities be points of equal cross sections therein, though such is the preferred construction.

It is obvious that I have provided an improved apparatus for metering fluids of high viscosity in a meter of the pressure differential responsive type and that employing my discovery of the natural law mentioned above I have devised a method of calibrating such an apparatus and employing such an apparatus for metering purposes to make it wholly independent of temperature, pressure and other variable conditions always present.

It is understood that my invention is not limited to the specific embodiments shown and processes described and that various deviations may be made therefrom without departing from the spirit and scope of the appended claims.

What I claim as new and desire to secure as Letters Patent is:—

1. In an inferential meter of the Venturi type for indicating the flow of a viscous fluid in a conduit, the combination of a conduit, an internally unmodified Venturi tube comprising converging and diverging sections, said tube being attached to said conduit and having a Venturi head indicating manometer attached thereto and a friction loss indicating manometer attached to the inlet and outlet of said Venturi tube.

2. In an inferential meter of the pressure differential responsive type for indicating the flow of a viscous fluid in a conduit, the combination of said conduit, a primary pressure differential producing element attached to said conduit and having means attached thereto for indicating the primary differential produced thereby, and an auxiliary element for producing a second pressure differential differing from the primary, said element being connected to said conduit in proximity to said primary differential producing element and having means attached thereto for indicating the auxiliary differential produced thereby, said pressure differential producing elements being so connected to said conduit that each is acted upon by the entire flow through said conduit to produce its respective differential.

3. The method of metering viscous fluids by metering means involving primary and auxiliary pressure differential determining devices, which method comprises passing fluids of different viscosities through said metering means over definite measured periods of time and otherwise measuring the volumes or weights of said fluids determining from said measurements the proper correction coefficient to be applied for each viscous fluid in the usual formula to give the actual velocity of said fluid, by dividing the measured velocity of such fluid by the theoretical velocity of a perfectly mobile fluid as computed from the measured primary differential of said metering means, determining the ratio of the primary pressure differential to the auxiliary pressure differential as indicated by the metering means for each such viscous flow, noting the relationship between said coefficients and the corresponding ratios for such flows over the desired range of viscosities; then, in the actual metering of any viscous fluid, determining the ratio of the two differentials produced by its flow through the metering means, and ascertaining therefrom the proper correction coefficient by the selection of that one indicated for that particular ratio by the relationship previously determined as above.

4. The steps in the method of metering viscous fluids by metering means involving primary and auxiliary pressure differential determining devices, which steps in the method comprise passing fluids of different viscosities through said metering means over definite measured periods of time and otherwise measuring the volumes or weights of said fluids, determining from said measurements the proper correction coefficient to be applied for each viscous fluid in the usual formula to give the actual velocity of said fluid, by dividing the measured velocity of such fluid by the theoretical velocity of a perfectly mobile fluid as computed from the measured primary differential of said metering means, determining the ratio of the primary pressure differential to the auxiliary pressure differential as indicated by the metering means for each such viscous flow, and noting the relationship between said coefficients and the corresponding ratios for such flows over the desired range of viscosities.

In testimony whereof I affix my signature.

FREDERICK N. CONNET.